Figure 1:
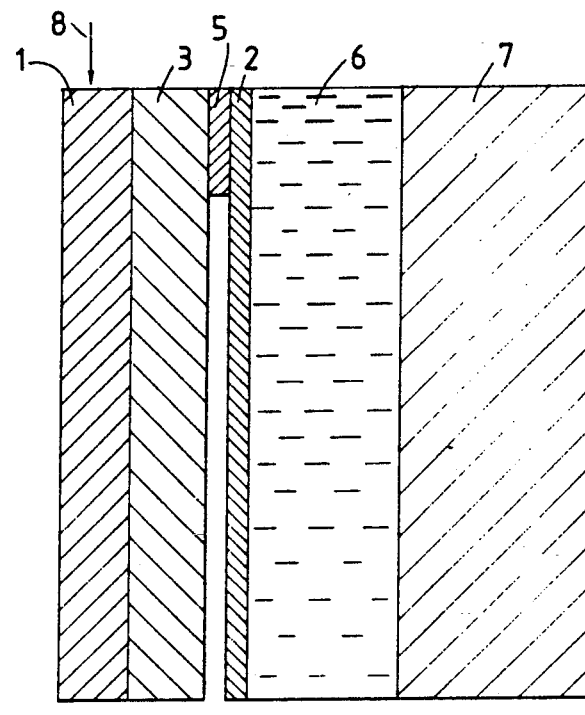

United States Patent [19]

Persson

[11] Patent Number: 5,104,027
[45] Date of Patent: Apr. 14, 1992

[54] METHOD OF EXPLOSION WELDING

[75] Inventor: Per I. Persson, Gyttorp, Sweden

[73] Assignee: Exploweld AB, Nora, Sweden

[21] Appl. No.: 610,589

[22] Filed: Nov. 8, 1990

[30] Foreign Application Priority Data

Nov. 8, 1989 [SE] Sweden ............... 8903747

[51] Int. Cl.$^5$ ........................... B23K 20/08
[52] U.S. Cl. ................... 228/107; 228/108; 29/514; 29/523
[58] Field of Search ............. 228/107, 108, 109, 2.5, 228/126; 29/514, 522.1, 523, 421.1, 421.2

[56] References Cited

U.S. PATENT DOCUMENTS

| | | | |
|---|---|---|---|
| 3,360,848 | 1/1968 | Saia | 228/107 |
| 3,419,951 | 1/1969 | Carlson | 29/421.2 |
| 3,863,327 | 2/1975 | Legate et al. | 228/107 |
| 3,900,147 | 8/1975 | Apalikov et al. | 228/107 |
| 3,940,049 | 2/1976 | Richter et al. | 228/107 |
| 4,494,392 | 1/1985 | Schroeder | 29/421.2 |

Primary Examiner—RIchard K. Seidel
Assistant Examiner—Chuck Y. Mah
Attorney, Agent, or Firm—Nies, Kurz, Bergert & Tamburro

[57] ABSTRACT

An explosion welding method in which plating material is explosion welded to a base material with the aid of a reflected percussion wave generated by a detonating charge. The invention is characterized by placing the explosive charge (1) on that surface of the base material (3) which is remote from the ultimate bonded surface; placing the plating material (2) at a distance from the base material (3) and in contact with a pressure medium (6, 7), said pressure medium functioning to reflect and return a pressure wave introduced in the pressure medium (6, 7); placing along a short length between the base material (3) and the plating material (2) a pressure transmitting element (5) in abutment with both the base material and the plating material, initiation of the explosive charge (1) being effected at said pressure transmitting element (5), such that upon detonation of said charge the percusison wave will be transmitted through the base material (3) and initially through that part of the plating material (2) which lies in contact with the base material through the intermediary of the pressure transmitting element (5), and thereafter through that part of the plating material (2) which lies in contact with the base material (3) through bonding, said percussion wave being further propagated into the pressure medium (6, 7) where said wave is reflected and returned to the plating material which is therewith thrown against the base material.

9 Claims, 1 Drawing Sheet

METHOD OF EXPLOSION WELDING

The present invention relates to a method of explosion welding.

It has long been known to join metal elements together with the aid of explosion welding techniques. All of these known methods are characterized by the fact that the gases generated upon detonation of the explosive charge accelerate one or both of said metal elements to high velocities, such that collision occurs between the metal elements concerned. In certain cases, a buffer material is located between the explosive charge and one of the metal elements.

The present method differs from the earlier known methods. Among other things, the present method affords the advantage of equalizing pressure differences caused by disturbances in the detonation sequence. A further advantage is that the plating material is not influenced thermally or chemically by the detonation gases.

Another, important advantage is that the method provides completely novel possibilities of optimizing the explosion welding process. One problem with known methods is that because those explosive substances suitable in the present context have a given critical thickness within which detonation cannot occur, it is necessary to explosion weld thin plating layers with excessive explosive energy. An excessively powerful charge will result in melting of the materials in the join region, which weakens the join. This problem is avoided with the present invention.

The present invention thus relates to a method of explosion welding in which plating material is explosion welded to a base material by means of a reflected percussion wave generated by a detonating explosive charge, and is characterized in that the explosive charge is placed on that surface of the base material which is remote from the ultimate bonded surface; in that the plating material is placed at a distance from the base material and in contact with a pressure medium, said pressure medium being intended to reflect and return a pressure wave introduced in the pressure medium; in that there is placed along a short distance between the base material and the plating material a pressure transfer element which is in abutment with both the base material and the plating material, wherein initiation of the explosive charge is caused to take place at the pressure transfer element, whereby, upon detonation of said explosive charge, percussion waves are transmitted through the base material and initially through that part of the plating material in contact with the base material via the pressure transfer element and thereafter through that part of the plating material which lies in bonding contact with the base material, said percussion wave being further propagated in the pressure medium, where it is reflected and returned to the plating material which is therewith thrown against the base material.

Figure 2:
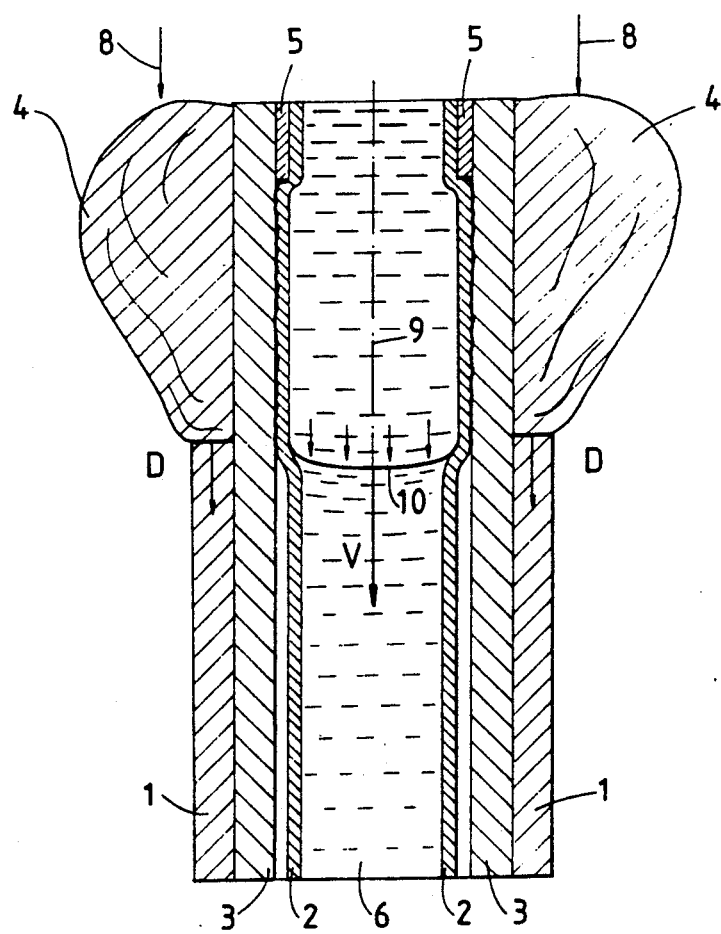

The invention will now be described in more detail with reference to exemplifying embodiments of the invention illustrated in the accompanying drawings, in which FIG. 1 illustrates the set-up according to a first embodiment, and FIG. 2 illustrates a set-up according to a second embodiment.

FIGS. 1 and 2 illustrate two embodiments of the invention. In the Figures, the reference numeral 1 identifies an explosive charge, the numeral 2 identifies the plating material, the numeral 3 identifies the base material, the numeral 4 identifies a detonated part of the explosive charge, the numeral 5 identifies a pressure transfer element, the numeral 6 identifies a pressure transfer body, and the numeral 7 identifies a reflection medium.

According to the invention, the plating material 2 is explosion welded to the base material 3 with the aid of a reflected percussion wave generated by the explosive charge 1. This is achieved in accordance with the invention by placing the explosive charge 1 on that surface of the base material 3 which is remote from the ultimate bonded surface, and by placing the plating material 2 at a distance from the base material 3 and in contact with a pressure medium 6, 7. The pressure medium 6, 7 functions to reflect and return a pressure wave introduced into the pressure medium.

A pressure transfer element 5 is placed in abutment with both the base material and the plating material, over a short length between said base material 3 and the plating material 2. The pressure transfer element is suitably made of metal, so as to produce a substantially reflection-free transmission of the percussion wave.

Initiation of the explosive charge is caused to take place at the place indicated by the arrow 8, i.e. at the edge of the explosive charge where the pressure transfer element 5 is positioned. Ammonium nitrate explosives or nitroglycerin explosives are preferably used when practising the inventive method.

Upon detonation of the explosive charge 1 the shock wave or percussion wave is initially transmitted through the base material 3 and through that part of the plating material 2 which lies in contact with the base material 3 via the pressure transfer element 5. Subsequent to this initial stage, the percussion wave is propagated through part of the plating material which lies in contact with the base material through the bond achieved between the base material and the plating material. Subsequent to having passed through the plating material, the percussion wave propagates into the pressure medium 6, 7 and is there reflected and returned to the plating material, which is therewith thrown against the base material such as to create a bond therebetween.

According to one embodiment of the invention, illustrated in FIG. 1, the pressure medium includes a pressure transmitting body 6 and a reflective medium 7. The pressure transmitting body 6 is preferably a liquid, although it may alternatively be a solid body. The advantage with using a liquid is that very good contact is achieved between the plating material and the reflection medium respectively. The reflection medium 7 consists of a solid body whose density is greater than the density of the pressure transmitting body 6. Thus, in the case of this embodiment, the percussion wave is reflected onto the interface surface between the pressure transmitting body 6 and the reflective medium 7.

In the case of another embodiment, illustrated in FIG. 2, no reflective medium is present and instead percussion waves are generated with opposite directions of propagation.

According to this latter embodiment, the pressure medium includes a pressure transmitting body 6 which may either be a liquid or a solid body. The reflection medium used in this case has the form of a second percussion wave which is generated in the same manner as the first percussion wave and caused to have a propagating direction opposite to that of the first mentioned percussion wave.

The two percussion waves are caused to be generated by two similar set-ups of planar configuration, as illustrated in FIG. 2, each comprising an explosive charge 1, base material 3, plating material 2 and a pressure transmitting element 5. The set-ups are located adjacent one another and are directed towards each other. The pressure medium 6 is thus common to both set-ups and is located therebetween.

In FIG. 2 the letter D signifies the detonation fronts in the two charges 1. The percussion waves generated in the aforesaid manner are reflected towards each other at the symmetry line 9 of the pressure medium 6. The double percussion-wave pressure is obtained upon reflection in the planar case. Consequently, the percussion wave front 10 obtains an elevated velocity V and will consequently lie axially in front of the detonation fronts. This is a prerequisite for the percussion wave emitted by the charge to be transferred effectively to the pressure medium 6. When the percussion wave has had time to establish, which occurs downstream of the pressure transmitting element 5 in the detonation direction, this state will remain relatively constant, since it is sustained from the rear by the percussion wave from the detonation fronts.

Although FIG. 2 has been described with reference to planar workpieces, it will be understood that the present invention can also be applied with curved workpieces and also with cylindrical workpieces.

FIG. 2 can equally as well illustrate the embodiment of the invention in which the base material and the plating material are cylindrical.

In this case, a cylindrical explosive charge 1, the base material 3 and the plating material 2 are arranged in that order radially from outwards towards inwards. Furthermore, a cylindrical pressure transfer element 5 is located between the base material and the plating material. The pressure material 6 is positioned inwardly of the plating material 2. As a result, radially moving percussion waves are generated which are reflected against each other at the symmetry line of the pressure medium. In this case, the pressure exerted by the percussion wave will be greater than the pressure exerted by the double percussion wave, which is the case in said planar case.

It will be evident from the aforegoing that the present invention provides the aforesaid advantages over the known technique.

Although the invention has been described above with reference to various embodiments thereof, it will be understood that modifications can be made, inter alia with respect to the mutual dimensions of the various parts included.

The invention shall therefore not be considered to be limited to the aforedescribed embodiments, since modifications can be made within the scope of the following claims.

I claim:

1. An explosion welding method in which plating material with first and second opposite surfaces is explosion welded at its first surface to a first surface of a base material, which has first and second opposite surfaces, with the aid of a reflected percussion wave generated by a detonating explosive charge, said method comprising placing the explosive charge (1) on the second surface of the base material (3); placing the plating material (2) with its first surface spaced apart a distance from the first surface of said base material (3) and with the second surface of said plating material in contact with a pressure medium (6, 7), said pressure medium functioning to reflect and return a pressure wave introduced in the pressure medium (6, 7) through said plating material; placing along a short length, of a pressure transmitting element (5), between the base material (3) and the plating material (2) in abutment with both the base material and the plating material; effecting initiation of the explosive charge (1) at the location of said pressure transmitting element (5), such that, upon detonation of said charge, the percussion wave of the explosion will be transmitted through the base material (3) and initially through that part of the plating material (2) which lies in contact with the base material through the intermediary of the pressure transmitting element (5), and thereafter through that part of the plating material (2) which moves into and resides in contact with the base material (3) through explosion bonding, said percussion wave of the explosion being further propagated through said base material and through said plating material into the pressure medium (6, 7) where said wave is reflected back through said pressure medium and returned to the second surface of said plating material which plating material is therewith thrown against and bonded to the base material.

2. A method according to claim 1, wherein the pressure medium includes a pressure transmitting body (6) and a reflective medium (7) which consists of a body of greater density than the density of the pressure transmitting body.

3. A method according to claim 2, wherein said pressure transmitting body is a liquid.

4. A method according to claim 2, wherein said pressure transmitting body is a solid.

5. A method according to claim 1, wherein the pressure medium includes a pressure transmitting body (6), and a reflective medium which is a second percussion wave generated in the same manner as said first mentioned percussion wave, said second percussion wave being caused to have a propagation direction opposite to that of said first mentioned percussion wave.

6. A method according to claim 5, wherein said two percussion waves are caused to be generated by two set-ups, each set-up including a said explosive charge (1), a said base material (3), a said plating material (2) and a said pressure transmitting element (5), said set-ups being located adjacent one another and directed towards each other so that the said pressure medium (6) is common for both set-ups and is located therebetween.

7. A method according to claim 5, wherein said base material (3) and said plating material (2) are cylindrical in shape, and further comprising placing in order, and coaxial, a cylindrical explosive charge (1), the cylindrical base material (3) and the cylindrical plating material (2) in concentric disposition adjacent one another radially from without toward within; placing a cylindrical pressure transmitting element (5) between and in contact with a short extent of the base material (3) and the plating material (2), and by placing a substantially cylindrical body of said pressure medium (6) having an axial center line within, encircled by and engaging and on the axis of the cylindrical plating material (2), whereupon igniting of said explosive charge results in radially inwardly moving percussion waves being generated which are reflected against each other at the axial center line (9) of said body of the pressure medium.

8. A method according to claim 3, wherein said pressure transmitting body is a liquid.

9. A method according to claim 3, wherein said pressure transmitting body is a solid.

* * * * *